United States Patent
Li (10) Patent No.: US 6,427,988 B1
(45) Date of Patent: Aug. 6, 2002

(54) VIBRATION REDUCING DEVICE FOR BICYCLES

(75) Inventor: Yi-Ten Li, Taichung (TW)

(73) Assignee: Gigga Corp., Taichung (TW)

( * ) Notice: Subject to any disclaimer, the term of this patent is extended or adjusted under 35 U.S.C. 154(b) by 40 days.

(21) Appl. No.: 09/191,452

(22) Filed: Nov. 12, 1998

(30) Foreign Application Priority Data

Oct. 14, 1998 (TW) .......................................... 87217051

(51) Int. Cl.⁷ .............................................. F16F 15/00
(52) U.S. Cl. .................. 267/140.11; 267/148; 267/153; 280/276
(58) Field of Search ................ 188/371, 372, 188/376, 377, 268, 322.13; 267/140, 140.11, 141, 141.1, 141.6, 147, 148, 149, 195, 140.13, 153, 128; 280/276, 281.1

(56) References Cited

U.S. PATENT DOCUMENTS

| | | | | |
|---|---|---|---|---|
| 2,428,148 A | * | 6/1944 | Dawson ...................... | 280/276 |
| 2,602,181 A | * | 7/1952 | Knipe ......................... | 267/128 |
| 2,773,686 A | * | 12/1956 | Nash ......................... | 267/64.27 |
| 2,800,321 A | * | 7/1957 | Jarret et al. .................. | 188/268 |
| 3,412,990 A | * | 7/1966 | Gladstone ..................... | 267/153 |
| 3,591,164 A | * | 7/1971 | Jamieson ..................... | 267/140 |
| 3,687,440 A | * | 8/1972 | Jarret et al. .................. | 267/141 |
| 4,096,927 A | * | 7/1978 | Takatsu ....................... | 267/140 |
| 4,109,899 A | * | 8/1978 | Takatsu ....................... | 267/140 |
| 4,336,868 A | * | 6/1982 | Wilson et al. ............... | 188/376 |
| 4,424,961 A | * | 1/1984 | Takei ......................... | 267/141 |
| 4,974,820 A | * | 12/1990 | Nakanishi .................... | 188/371 |
| 5,035,307 A | * | 7/1991 | Sadeghi et al. .............. | 188/372 |
| 5,429,344 A | * | 7/1995 | Stewart ....................... | 267/141 |
| H1833 H | * | 2/2000 | Hoppel et al. .............. | 188/377 |

* cited by examiner

Primary Examiner—Paul N. Dickson
Assistant Examiner—Thomas J. Williams
(74) Attorney, Agent, or Firm—Pro-Techtor International Services (57) ABSTRACT

A vibration reducing device for bicycles that includes a sulfurated synthetic rubber shrinkable knotted tube. The tube has at least one spherical knot and a net reinforcing layer formed in a circumferential wall. An air valve is used to control air pressure in the device.

4 Claims, 8 Drawing Sheets

VIBRATION REDUCING DEVICE FOR BICYCLES

BACKGROUND OF THE INVENTION

This invention relates to a vibration reducing device for bicycles, particularly to one designed to be provided with a progressive vibration-absorbing structure.

Figure 1:
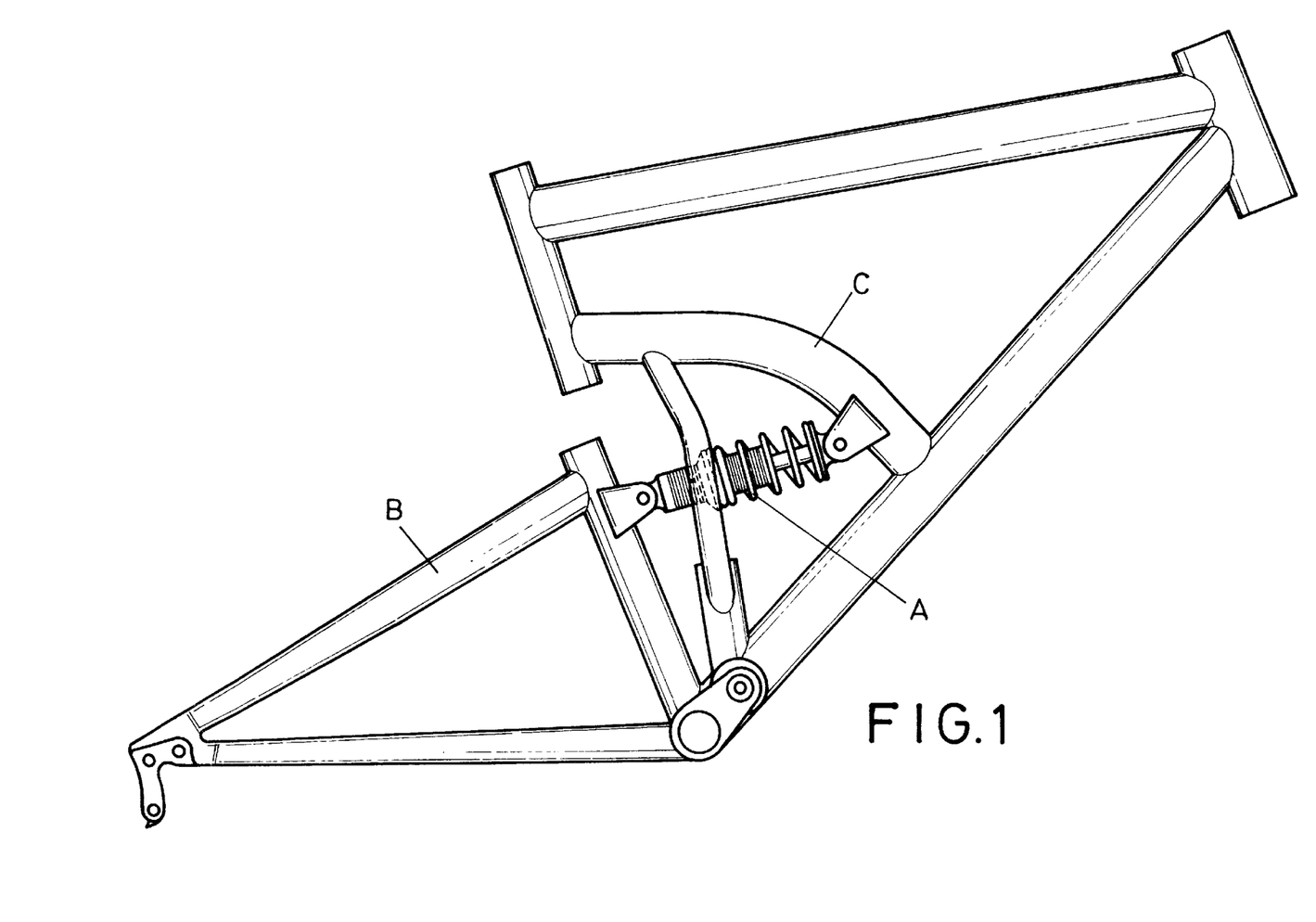
FIG. 1 is a side view of a conventional rear-mounted vibration reducing device.

A conventional vibration reducing device for bicycles may be a front-mounted vibration reducing device or a rear-mounted vibration reducing device. The front-mounted device is located at a front fork. The rear-mounted device is located almost horizontally between a seat stay A and a crosswise tube B, as shown in FIG. 1.

It is well known that a conventional vibration reducing device, whether front-mounted or rear-mounted, includes a vibration absorbing element such as a spiral spring, and an oil pressure guide rod provided in the axial direction. The rear-mounted vibration device is quite susceptible to damage, due to the seat stay contacting the rear-mounted vibration reducing device and non-axial compression causing bending or breaking of the oil pressure guide rod or oil leakage from the oil pressure cylinder.

Further, a bicycle equipped with a vibration reducing device may be used on rough, uneven ground so that the oil pressure cylinder for the oil pressure guide rod of the front-mounted vibration reducing device may be easily damaged.

Further, the tendency toward designing a bicycle of light weight may weaken a traditional vibration reducing device.

SUMMARY OF THE INVENTION

The present invention has been devised to offer a vibration reducing device for bicycles using a sulfurized synthetic rubber shrinkable knotted tube as a vibration absorbing element. The synthetic rubber shrinkable knotted tube is provided with at least one spherical knot, and with a net reinforcing layer contained in the tube wall to add strength and resilience to the shrinkable knotted tube A feature of the invention is the synthetic rubber vibration knotted tube provided with one or more knots that function as shrinking and lengthening elements. The tube is filled with air for adjusting elastic response to vibration.

Another feature of the invention is the synthetic rubber shrinkable knotted tube provided with two spherical knots with different thicknesses or with different outer diameters.

One more feature of the invention is that the synthetic rubber shrinkable knotted tube is made of a material with an excellent elastic property, so that it will not break or split.

BRIEF DESCRIPTION OF DRAWINGS

This invention will be better understood by referring to the accompanying drawings, wherein.

DETAILED DESCRIPTION OF THE PREFERRED EMBODIMENTS

Figure 2:
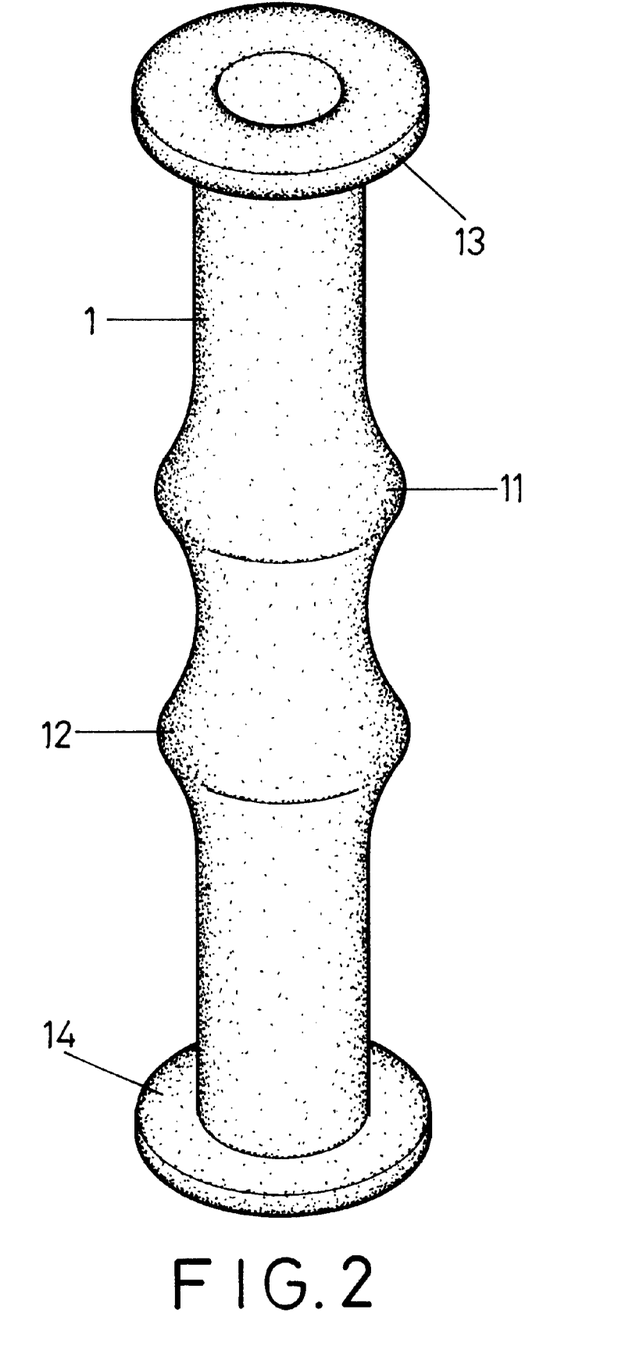
FIG. 2 is a perspective view of a first embodiment of a shrinkable knotted tube of the present invention.
Figure 3:
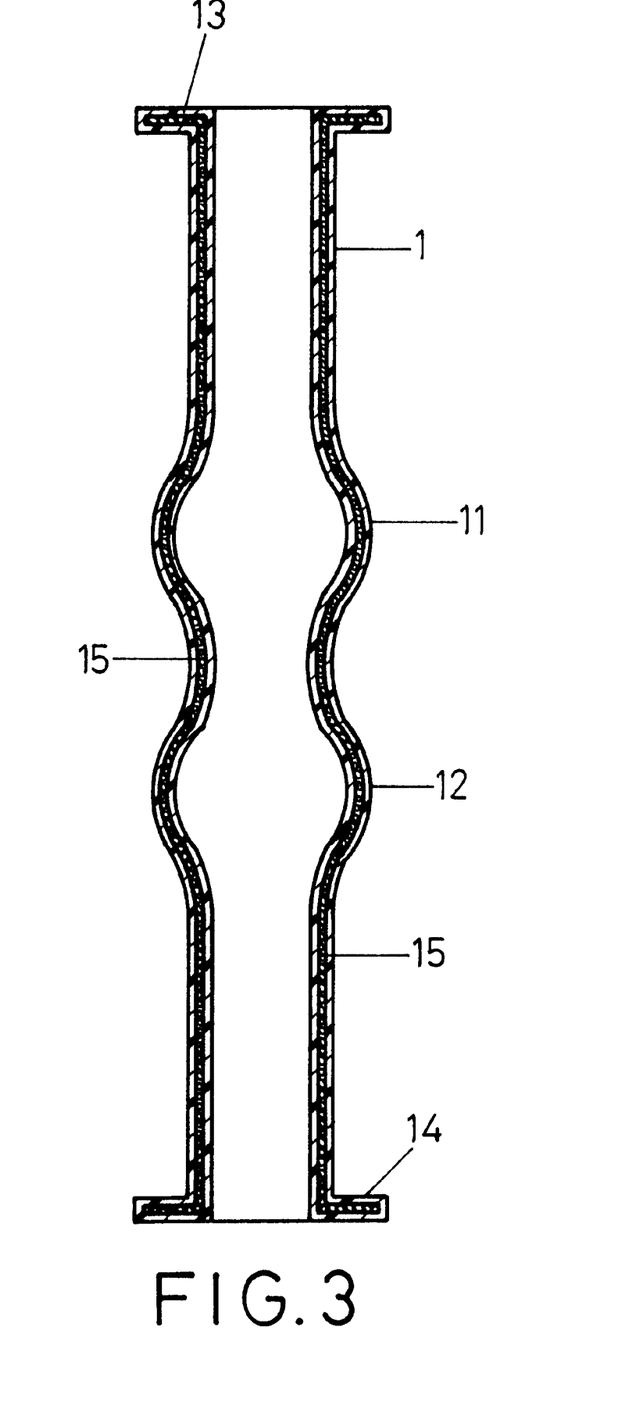
FIG. 3 is a cross-sectional view of the first embodiment of a shrinkable knotted tube of the present invention, showing a net reinforcing layer.
Figure 4:
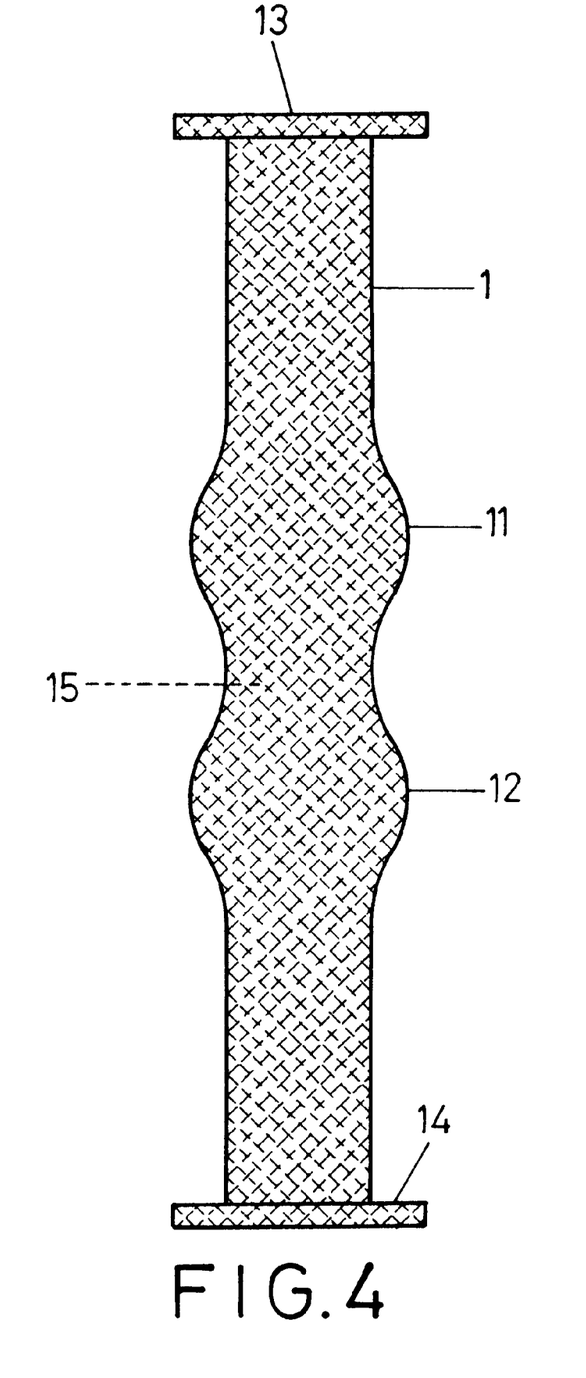
FIG. 4 is a front view of the net reinforcing layer of the present invention.

A first embodiment of a vibration reducing device in the present invention. as shown in FIG. 2, includes a sulfurized synthetic rubber shrinkable knotted tube 1 provided with two spherical knots 11, 12, and two flanges 13, 14 respectively formed in an upper end and in a lower end of the tube 1. A nylon net reinforcing layer 15 is included in the circumferential wall of the shrinkable knotted tube 1 to strengthen the wall of the tube 1, as shown in FIGS. 3 and 4.

The spherical knots 11, 12 provide the shrinkable knotted tube 1 with compressibility, by expanding diametrically to let the tube compress when receiving axial compression forces. The knots 11, 12 cause the tube 1 to lengthen to its original length when the force compressing the tube 1 is removed. Therefore, the shrinkable knotted tube 1 may be used as a vibration reducing device for bicycles, with the spherical knots functioning to absorb vibration.

Figure 5:
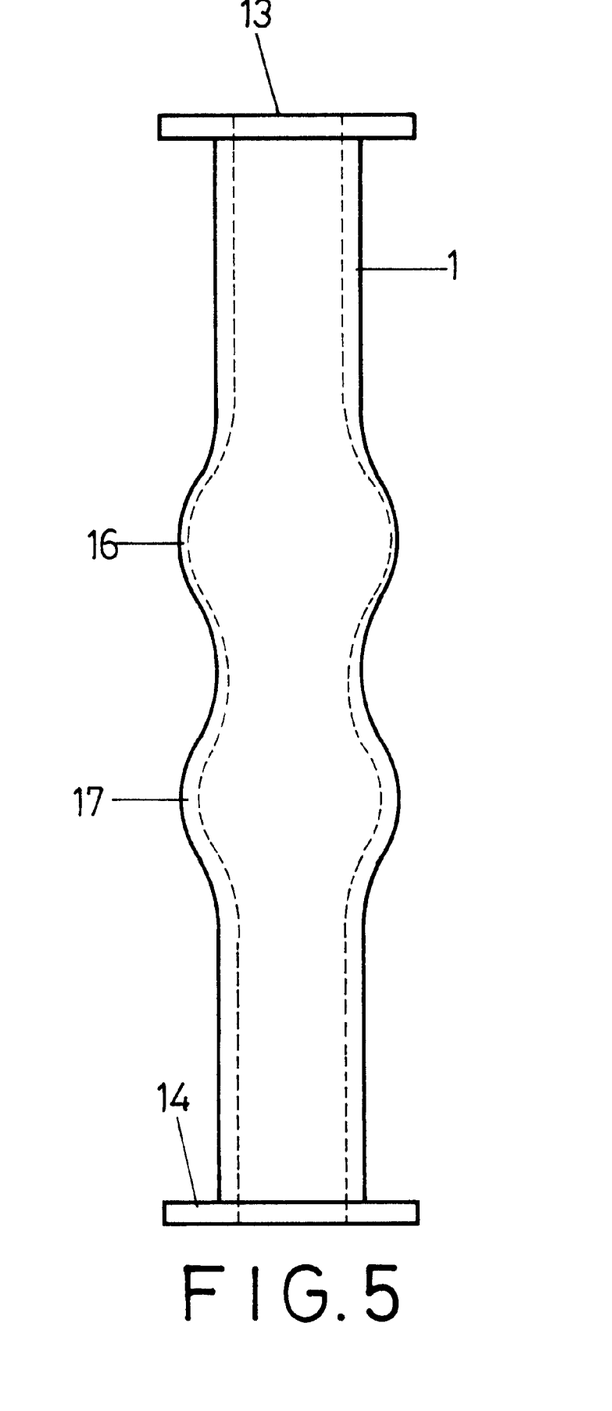
FIG. 5 is a front view of a second embodiment of a shrinkable knotted tube of the present invention, showing two spherical knots with different thickness.
Figure 6:
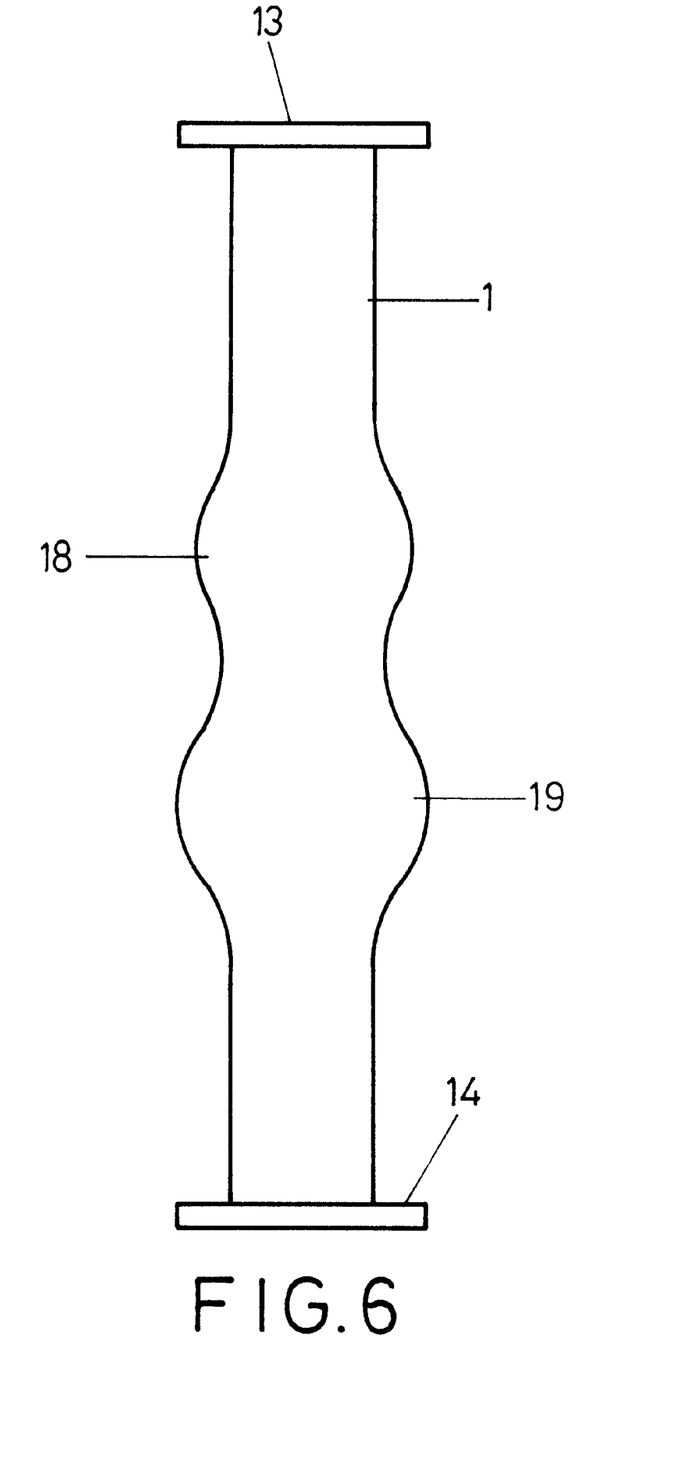
FIG. 6 is a front view of a third embodiment of a shrinkable knotted tube of the present invention, showing two spherical knots with different diameters.

Further, the spherical knots of the shrinkable knotted tube 1 can be designed to have two spherical knots 16, 17 (shown in FIG. 5) with different thicknesses and with different diameters.

Figure 7:
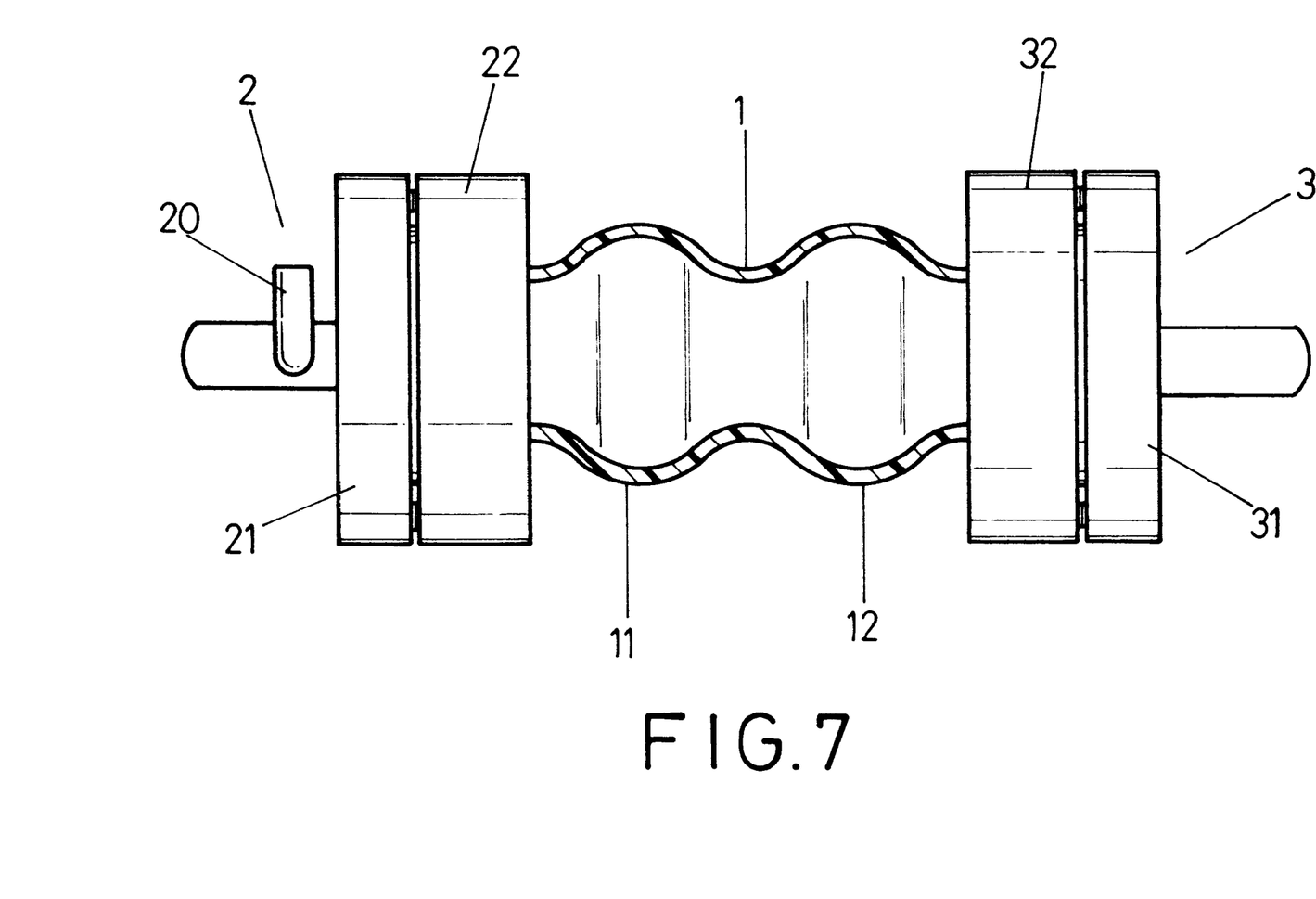
FIG. 7 is a partial axis cross-sectional view of a rear-mounted vibration reducing device of the present invention; and, FIG. 8 is an axial cross-sectional view of a front-mounted vibration reducing device of the present invention.

The shrinkable knotted tube 1 can be used as a rear-mounted vibration reducing device as shown in FIG. 7, further including a first connector 2 and a second connector 3 at the two ends of the shrinkable knotted tube 1, which is sealed by the two connectors 2, 3. The first connector 2 also has an air valve 20 communicating with the interior of the shrinkable knotted tube 1.

The first connector 2 has a front portion 21 and a rear portion 22, and seals the front flange 13 of the shrinkable knotted tube 1. The second connector 3 also has a front portion 31 and a rear portion 32, and seals the rear flange 14 of the shrinkable knotted tube 1. The front portions 21, 31 and the rear portions 22, 32 of the first and the second connectors 2 and 3 are respectively joined with hidden screws.

Figure 8:
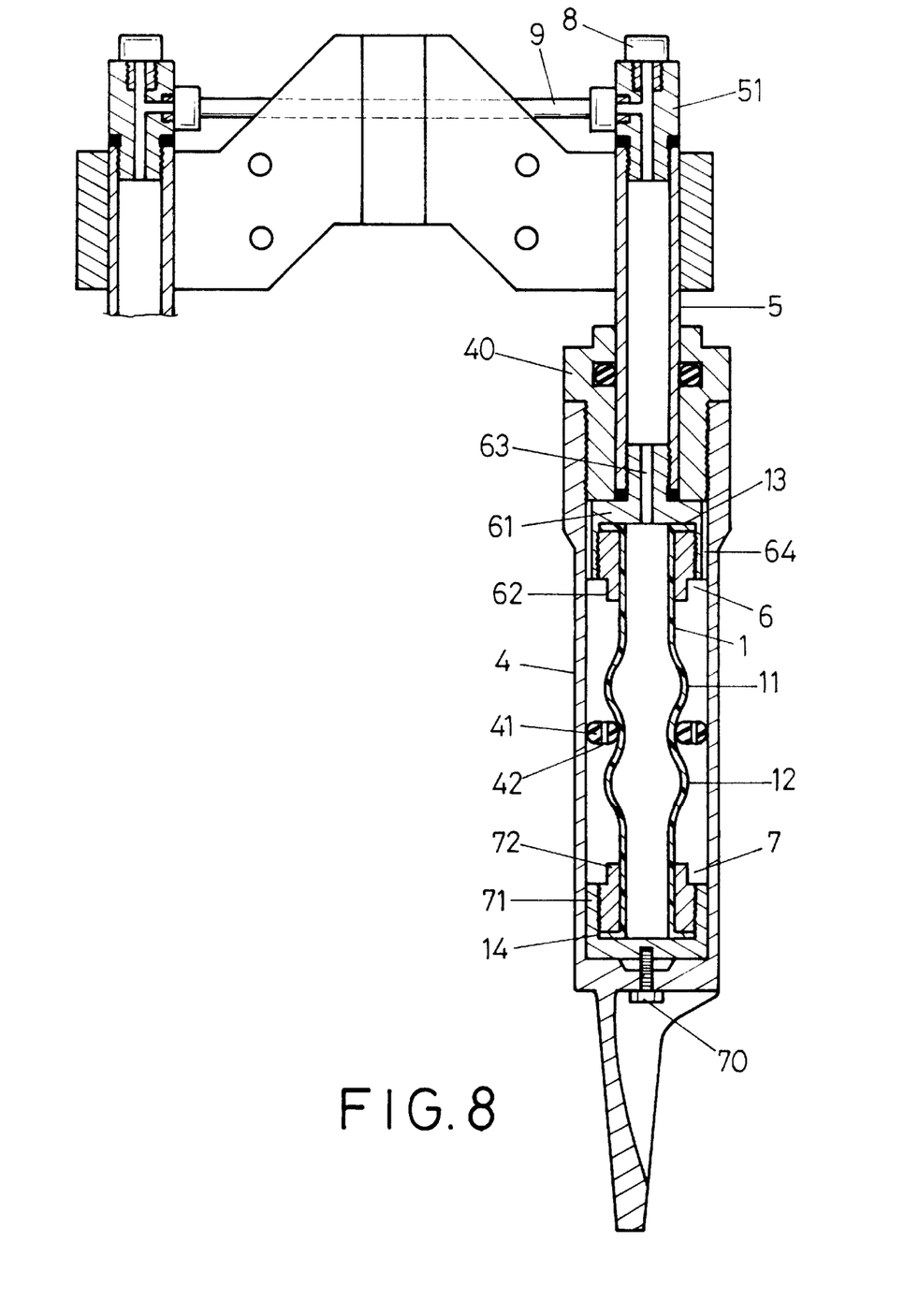

The shrinkable knotted tube 1 can be used as a front-mounted vibration reducing device as shown in FIG. 8, including a vibration reducing cylinder 4 that encloses the shrinkable knotted tube 1. The vibration reducing cylinder 4 has a top cap 40 screwed onto an upper end of the cylinder 4. The top cap 40 has a center hole that receives a connect tube 5. The connect tube 5 is sealed with a top cap 51. The shrinkable knotted tube 1 is located between the lower end of the connect tube 5 and an inner bottom of the cylinder 4. Further. an upper connector 6 seals the upper end of the tube 1, and contacts the lower end of the connect tube 5. A lower connector 7 seals the lower end of the shrinkable knotted tube 1, and is fixed tightly with the inner bottom of the vibration reducing cylinder 4 with a screw 70.

The upper connector 6 has a front portion 61 and a rear portion 62, and is secured to the upper flange 13 of the shrinkable knotted tube 1. The lower connector 7 also has a front portion 71 and a rear portion 72, and is secured to the lower flange 14 of the shrinkable knotted tube 1. The front connector 6 further has a center passageway 63 communicating with the connect tube 5 and with the shrinkable knotted tube 1.

The top cap 51 of the connect tube 5 is provided with an air valve 8 communicating with the interior of the shrinkable knotted tube 1.

A correcting ring 41 is fitted around the outer surface of shrinkable knotted tube 1 between the two spherical knots 11, 12 for preventing the shrinkable knotted tube 1 from bending. The correcting ring 41 has several air holes 42 axially.

Further, an axial annular hole 64 is formed between the outer surface of the upper connector 6 and the inner surface of the vibration reducing cylinder 4, functioning to permit the shrinkable knotted tube 1 to shrink or expand smoothly.

If two front-mounted vibration reducing devices are used together as illustrated in FIG. 8, a connecting tube 9 may be provided between the two connect tubes 5 so as to balance air pressure in the two shrinkable knotted tubes 1.

While the preferred embodiments of the invention have been described above, it will be recognized and understood that various modifications may be made therein and the appended claims are intended to cover all such modifications which may fall within the spirit and scope of the invention.

I claim:

1. A vibration reducing device for bicycles comprising:

a vibration reducing cylinder with connecting means on two ends of said cylinder, an inflatable tube mounted between said connecting means of said cylinder, said connecting means seal ends of said inflatable tube, said inflatable tube includes at least one expanded area; wherein said at least one expanded area absorbs compression forces applied to said device, and said at least one expanded area restores said device to an original position when the compression forces are removed.

2. The vibration reducing device for bicycles as claimed in claim 1, wherein:

at least two units of said inflatable tube are utilized concurrently, and a connecting tube is provided between said at least two units of said inflatable tube to equalize air pressure in said at least two units.

3. The vibration reducing device as claimed in claim 1, wherein:

said tube has at least two expanded areas, a first one of said expanded areas has a wall of a first thickness, and a second one of said expanded areas has a wall of a second thickness, said first thickness not being equal to said second thickness.

4. The vibration reducing device as claimed in claim 1, wherein:

said tube has at least two expanded areas, a first one of said expanded areas has a first diameter, and a second one of said expanded areas has a second diameter, said first diameter not being equal to said second diameter.

* * * * *